(12) United States Patent
Islam et al.

(10) Patent No.: US 8,767,618 B2
(45) Date of Patent: *Jul. 1, 2014

(54) SYSTEM AND METHOD FOR REGISTRATION AND PACKET DATA RECONNECT

(75) Inventors: M. Khaledul Islam, Kanata (CA); Shahid R. Chaudry, Kanata (CA); William Daniel Willey, San Francisco, CA (US)

(73) Assignee: BlackBerry Limited, Waterloo (CA)

(*) Notice: Subject to any disclaimer, the term of this patent is extended or adjusted under 35 U.S.C. 154(b) by 90 days.

This patent is subject to a terminal disclaimer.

(21) Appl. No.: 13/017,918

(22) Filed: Jan. 31, 2011

(65) Prior Publication Data

US 2011/0122847 A1 May 26, 2011

Related U.S. Application Data

(63) Continuation of application No. 11/057,032, filed on Feb. 11, 2005, now Pat. No. 7,911,996.

(51) Int. Cl.
  *H04W 4/00* (2009.01)
  *H04W 36/00* (2009.01)
(52) U.S. Cl.
  USPC ......... 370/328; 370/331; 455/435.1; 455/436
(58) Field of Classification Search
  None
  See application file for complete search history.

(56) References Cited

U.S. PATENT DOCUMENTS

| 6,766,168 | B1* | 7/2004 | Lim ........................... 455/435.1 |
| 7,110,377 | B2* | 9/2006 | Hsu et al. ...................... 370/331 |
| 2002/0068570 | A1 | 6/2002 | Abrol et al. |
| 2002/0141361 | A1 | 10/2002 | Madour et al. |
| 2003/0099219 | A1 | 5/2003 | Abrol et al. |
| 2004/0063431 | A1 | 4/2004 | Julka et al. |
| 2004/0071112 | A1 | 4/2004 | Hsu et al. |
| 2004/0153648 | A1 | 8/2004 | Rotholtz et al. |
| 2004/0184436 | A1 | 9/2004 | Abrol et al. |
| 2004/0258022 | A1 | 12/2004 | Julka et al. |
| 2004/0266450 | A1 | 12/2004 | Chowdhury |
| 2005/0079867 | A1 | 4/2005 | Balachandran et al. |
| 2005/0169249 | A1 | 8/2005 | Shirota et al. |
| 2006/0099946 | A1 | 5/2006 | Burgess et al. |

FOREIGN PATENT DOCUMENTS

| WO | 2004064292 | 7/2004 |
| WO | 2004084494 | 9/2004 |

OTHER PUBLICATIONS

Data Service Options for Spread Spectrum Systems: Options 33 and 66; 3GPP2 C.S. 0017-012-A-Version1, Jun. 11, 2004.

(Continued)

*Primary Examiner* — Hassan Phillips
*Assistant Examiner* — Hicham Foud
(74) *Attorney, Agent, or Firm* — Novak Druce Connolly Bove + Quigg LLP

(57) ABSTRACT

Methods, mobile stations and networks are provided that cause a packet data service reconnect to be performed automatically after the occurrence of an event triggering registration, even in some circumstances where such a data service reconnect would not normally occur. This avoids complications that can arise due to the packet data service being discontinued upon registration and the resulting inability to reach the mobile station.

5 Claims, 7 Drawing Sheets

(56) References Cited

OTHER PUBLICATIONS

3rd Generation Partnership Project 2 3GPP2. Upper Layer(Layer3) Signaling Standard for cdma 2000 Spread Spectrum Systems' 3 GPP2 C. S0005-A, Online! Jun. 1, 1999, XP002345602 Retrieved from the Internet: URL:http://www.3gpp2.org/Public_html/specs/C.S.0005-A.pdf. Retrieved on Sep. 19, 2005 paragraphs 2.6.5.1.2.6.5.1.5 paragraphs 2.6.5.1.8.

* cited by examiner

SYSTEM AND METHOD FOR REGISTRATION AND PACKET DATA RECONNECT

RELATED APPLICATION

This application is a continuation of U.S. application Ser. No. 11/057,032 filed Feb. 11, 2005, now U.S. Pat. No. 7,911,996 the entire disclosure of which is incorporated by reference in its entirety.

FIELD OF THE APPLICATION

The application relates to registration and packet data connect in wireless systems.

BACKGROUND

To comply with the 3GPP2 CDMA packet data services standard "3GPP2 C.S0017-012-A v1.0: Data Service Options for Spread Spectrum Systems: Service Options 33 and 66" (also known as TIA-707.12-B), a mobile station with a dormant packet data session is required to "reconnect" its packet data service whenever it detects a change in System ID (SID), Network ID (NID) or Packet Zone ID (PZID) parameter associated with the wireless network. The reconnect process is required to maintain PPP (point-to-point protocol) connectivity in case the wireless network needs to move the so-called "R-P" interface (also known as A10 and A11) between the Radio Access Network (RAN) and the Packet Data Servicing Node (PDSN) associated with the packet data service or in some cases needs to assign a new IP address to the mobile station. The reconnect process requires the mobile station to send an Origination message with Packet Data Service option and Data Ready to Send (DRS) bit set to 0. The wireless network may assign a traffic channel to the mobile station when the reconnect process takes place. A feature called "packet zone hysteresis" is included in 3GPP2 C.S0017-012-A v1.0 in order to minimize the number of reconnect attempts when the mobile station moves back and forth between two systems (such a SID/NID/PZID boundary). To implement the hysteresis feature, a mobile station keeps track of visited systems in a list which is called "Packet Zone List" in 3GPP2 C.S0017-012-A—each entry except the most recently added entry has an expiry timer. If a mobile station revisits a system whose timer has not expired yet and it does not have any data to send, then it refrains from reconnecting its data service until the hysteresis timer has expired.

To comply with the CDMA air-interface standard "3GPP2 C.S0005-Upper Layer (Layer 3) Signaling Standard for cdma2000 Spread Spectrum Systems" (also known as TIA2000.5) a mobile station may be required to perform different types of access network registration. There are multiple revisions of 3GPP2 C.S0005—the first one being 3GPP2 C.S0005-0 and the most recent one being 3GPP2 C.S0005-D. An example of a registration method which is common to all revisions of 3GPP2 C.S0005 is called "zone-based registration" in which the mobile station performs registration whenever it enters a zone that is not in the mobile station's zone list. Zones are uniquely identified by a zone number (REG_ZONE) in addition to the SID and NID of the zone.

BRIEF DESCRIPTION OF THE DRAWINGS

Embodiments will now be described with reference to the attached drawings in which.

DETAILED DESCRIPTION OF EMBODIMENTS

Figure 1:
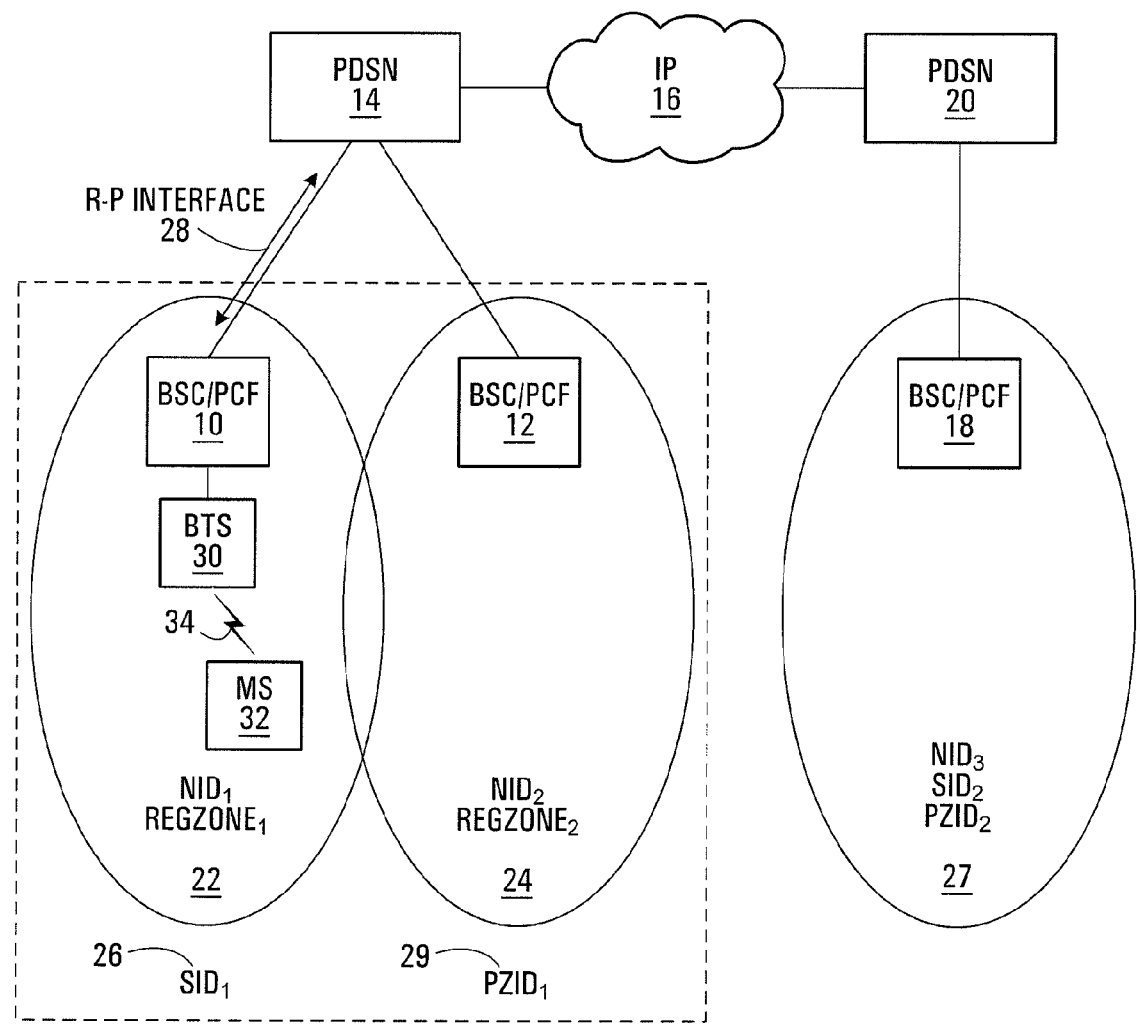
FIG. 1 is a block diagram of a system in which both packet data service reconnect and access network registration must be performed.

According to a broad aspect, there is provided a method in a mobile station, the method comprising: entering a state associated with one of timer-based registration, distance-based registration, zone-based registration, parameter change registration, and user zone registration, wherein the state is associated with sending a registration message; determining if a packet zone list contains an entry with an active packet zone hysteresis timer for a current packet data service zone; and if the packet zone list contains the entry for the current packet data service zone, removing the entry from the packet zone list corresponding to the current packet data service zone and sending an origination message in lieu of sending the registration message, wherein the origination message serves as an implicit access network registration.

According to another broad aspect, there is provided a mobile station comprising: a wireless access radio configured to communicate with a wireless network; and a coordinated registration and reconnect functional element configured to enter a state associated with one of timer-based registration, distance-based registration, zone-based registration, parameter change registration, and user zone registration, wherein the state is associated with sending a registration message; determine if a packet zone list contains an entry with an active packet zone hysteresis timer for a current packet data service zone; and if the packet zone list contains the entry for the current packet data service zone, removing the entry from the packet zone list corresponding to the current packet data service zone and send an origination message in lieu of sending the registration message, wherein the origination message serves as an implicit access network registration.

According to another broad aspect, there is provided a non-transitory computer readable medium having instructions stored thereon for execution by a processor of a mobile station and cause the mobile station to: enter a state associated with one of timer-based registration, distance-based registration, zone-based registration, parameter change registration, and user zone registration, wherein the state is associated with sending a registration message; determine if a packet zone list contains an entry with an active packet zone hysteresis timer for a current packet data service zone; and if the packet zone list contains the entry for the current packet data service zone, removing the entry from the packet zone list corresponding to the current packet data service zone and send an origination message in lieu of sending the registration message, wherein the origination message serves as an implicit access network registration.

Other aspects and features of the present disclosure will become apparent, to those ordinarily skilled in the art, upon review of the following description of the specific embodiments of the disclosure. It should be understood at the outset that although illustrative implementations of one or more embodiments of the present disclosure are provided below, the disclosed systems or methods or both may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The CDMA packet data service reconnect and the CDMA air-interface standard registration are not implemented co-operatively to produce an increased likelihood that a mobile station will be reachable in a given instant. For example, a CDMA air-interface standard registration zone boundary may also coincide with a SID/NID/PZID boundary. In such a case, it is possible that the mobile station will perform a zone-based registration after moving from a first registration zone to a second registration zone, but that the mobile station will not initiate packet data reconnect due to the fact that the new SID/NID/PZID was visited earlier and the associated hysteresis timer has not yet expired. Some networks may even terminate the existing R-P interface after the reception of the registration message in the new registration zone in order to handle potential dangling R-P resource issues. The removal of the R-P interface prior to establishment of the new R-P interface due to the lack of co-ordination between the registration process and the packet data service reconnect process may result in making the mobile station unreachable from the packet data perspective until the mobile station re-establishes the packet data connectivity. However, the mobile station may not be aware of the fact that the network has torn down an existing R-P interface. More particularly, if the mobile moves from the first zone to the second zone, a packet data reconnect will not occur until at least the hysteresis timer of the second zone expires. If the mobile station returns to the first zone before expiry of the hysteresis timer of the second zone, and the hysteresis timer for the first zone has not expired, a new R-P interface will not be established until the first zone hysteresis timer is expired. If there had not been a registration that resulted in the R-P interface in the first zone being torn down, the mobile station would have again been reachable after it returned to the first zone. Extended periods of time during which the mobile station is not reachable result in packet data for the mobile station being accumulated and then sent in a clumped manner to the always-on mobile station after it does become available.

The network shows a first PDSN (packet data service node) connected to two BSCs (base station controllers) 10,12. For some embodiments, it is assumed that a Packet Control Function (PCF) is collocated with BSC or resident with BSC functionality. Each BSC supports a respective wireless network. The details of this are not shown with the exception of a single BTS (base station transceiver) 30 shown under the control of BSC 10. The coverage area of BSC 10 has network identifier $NID_1$; the coverage area served by BSC 12 has network identifier $NID_2$. In the illustrated example, the coverage area of BSC 10 also has registration zone ID $REGZONE_1$ and the coverage area of BSC 12 has $REGZONE_2$. The overall area 29 through which packet service is provided by PDSN 14 has packet zone ID $PZID_1$. In the illustrated example, this area also has system ID $SID_1$ 26.

In the illustrated example, the network ID happens to be mapped one-to-one to the BSCs, but this may not necessarily be the case. There may be multiple BSCs having a single NID. Furthermore, in the illustrated example, the $PZID_1$ is one-to-one with the $SID_1$. More generally, this is not necessarily the case. A system ID will usually relate to multiple network IDs and the packet zone IDs will be independently mapped.

Also shown is a second PDSN 20 connected to a BSC 18 that operates within coverage areas having network ID $NID_3$, system ID $SID_2$ and packet zone ID $PZID_2$ 27.

A single mobile station MOBILE STATION 32 is shown within the coverage area of BTS 30. This mobile station has mobility and can move within different coverage areas and zones.

For mobile station 32, the relevant R-P interface is shown at 28 between PDSN 14 and BSC/PCF 10. The R-P interface transports user packet data from/to the mobile station and carries signalling messages. For example, it enables the mobile station 32 to be paged while it has a dormant packet data service.

To reiterate the problems with the behaviour resulting from the current standards, with C.S0005 zone-based registration, a mobile station will automatically register when it changes registration zones, for example when mobile station 32 moves from $REGZONE_1$ to $REGZONE_2$. If the change in registration zone coincides with a change in a SID/NID/PZID, then the change in registration zone will trigger the access network registration (i.e. the mobile station sends the C.S0005 Registration Message), and the change in the SID/NID/PZID will trigger a packet data service reconnect (i.e. the mobile station initiates the packet data reconnect by sending the C.S0005 Origination Message with the DRS field set to '0'), assuming that there is not an outstanding hysteresis timer for the new SID/NID/PZID. With this sequence of events, the mobile station is always reachable. This is the case for the movement of mobile station 32 from $REGZONE_1$ to $REGZONE_2$ because the network identifier also changes from $NID_1$ to $NID_2$.

If, on the other hand the mobile station moves to a second registration zone that is not on the registration zone list, but there is no change in the SID/NID/PZID, then an access network registration will occur which may tear down the existing R-P interface, but no reconnect process will occur because there has been no change in the SID/NID/PZID. With such a scenario, the mobile station will not be reachable until it instigates a data transmission. This would be the case in FIG. 1 where the area defined by $REGZONE_2$ to have the same network identifier as $REGZONE_1$.

A second problem is created due to the 3GPP2 C.S0017-012-A packet zone hysteresis. When a mobile station moves from the first registration zone $REGZONE_1$ to a second registration zone $REGZONE_2$ that is not on the registration zone list and simultaneously from a first SID/NID/PZID to a second SID/NID/PZID, an access network registration may be triggered that will tear down the R-P interface 28 within the first SID/NID/PZID. Assuming the mobile station has the new SID/NID/PZID in its packet zone list and it does not have any data to send, the mobile station will wait until the expiry of the hysteresis timer associated with the new SID/NID/PZID before issuing a packet data service reconnect by sending the C.S0005 Origination Message with the DRS field set to '0'. If, before the expiry of that hysteresis timer, the mobile station returns to the original SID/NID/PZID, then until the expiry of the hysteresis timer for that SID/NID/PZID, there will not be a packet data service reconnect. Note that in the absence of an access network registration when the mobile station moved from the first SID/NID/PZID to the second SID/NID/PZID, the R-P interface for the first SID/NID/PZID would not have been torn down, and when the mobile station returned to the first SID/NID/PZID it would have again immediately been reachable.

An embodiment of the application will now be described with reference to an example network depicted in FIG. 1. With the embodiment of FIG. 2, the network is the same as that shown in FIG. 1. However, shown is a mobile station 33 equipped with a co-ordinated registration and reconnect function 35. The behaviour of the co-ordinated registration and reconnect function 35 will be described in detail below with various examples. This function can be implemented as part of the software residing on the mobile station 33; it can be implemented in hardware or firmware; alternatively it can be implemented as an appropriate combination of software, hardware and firmware. Also, while shown is a discrete functional element 35, it is to be understood that it can also be implemented by making a series of modifications to software that is compliant with existing standards. For example, existing mobile stations have the capability to comply with 3GPP2 C.S0005 for the air-interface and 3GPP2 C.S0017-012-A for packet data services. The co-ordinated registration and reconnect function 35 can be embodied through a series of one or more changes to the otherwise standard compliant functionality.

Figure 2:
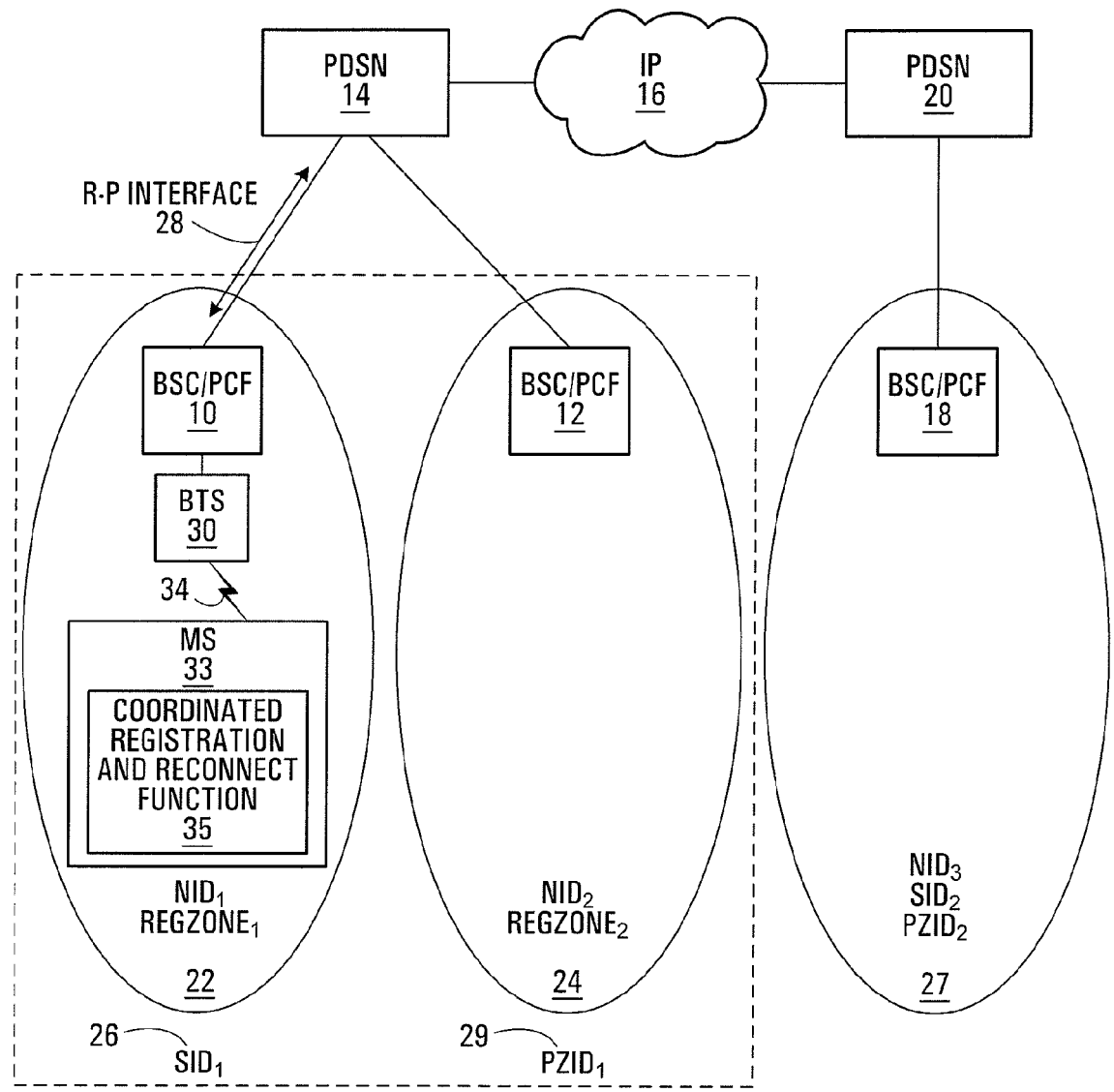
FIG. 2 is a block diagram of a system featuring a mobile station adapted to perform reconnect and registration in a co-ordinated manner.

It is to be very clearly understood that the network depicted in FIG. 2 is for the purpose of example and explanation only. An arbitrary arrangement of components is contemplated. Furthermore, the BSC/PCF, BTS hierarchy within a given network is but one example of a method of providing the air-interface through to a mobile station. Other hierarchies may alternatively be implemented. For different implementations, there still will be a registration interface, through the BTS and BSC in the illustrated example for the CDMA air-interface, and there is an R-P interface 28 for the CDMA packet data service or equivalent shown between the PDSN 14 and BSC/PCF 10 in the example.

In a first embodiment, whenever any event triggers an access network registration (see for example 2.6.5.1 of 3GPP2 C.S0005-D) of the following types (timer-based, zone-based, parameter-change, distance-based, or user zone-based) the mobile station will check to see if there is a system entry in its packet zone list with an unexpired hysteresis timer that matches the SID/NID/PZID of the current zone.

If there is one, the mobile station performs a reconnect procedure instead of registration and resets the associated hysteresis timer. The reconnect process constitutes sending an Origination Message which is considered as an "implicit" registration as per the 3GPP2 C.S0005 standard. In the event the mobile station is required to register and reconnect (e.g. entry to a new zone that is not on the mobile station's zone list or packet zone list), the mobile station only performs the reconnect procedure.

It is noted that it is preferred for the mobile station to perform the reconnect procedure instead of the registration. However, in 3GPP2 C.S0005-D for two types of access network registrations using the Registration Message, the associated necessary fields are currently missing from the Origination Message, thus creating a problem for these two types of registrations. For the encryption re-sync required Registration, there is a registration type (REG_TYPE) field in the 3GPP2 C.S0005-D Registration Message which tells the base station that the mobile is registering due to encryption re-sync being required; no equivalent field exists in the Origination Message. Similarly, for Broadcast Multicast (BCMC) Registration, when the mobile needs to change the BCMC frequency, it includes the following fields in the Registration Message to indicate the new BCMC frequency: BCMC frequency information included indicator (BCMC_FREQ_INFO_INCL), BCMC Band Class (BCMC_BAND_CLASS), and BCMC Frequency (BCMC_CDMA_FREQ); no equivalent fields exist in the Origination Message. Since fields are missing from the Origination Message, for an encryption re-sync required Registration and for a BCMC Registration including a frequency change, it will be necessary to send both the Registration message and the Origination Message used for packet data reconnect. Alternatively, if the Origination Message were modified to include a field to indicate to the base station that the mobile station requires an encryption re-sync (this could be by adding the REG_TYPE field to the Origination Message or could be by adding another field such as a one-bit indicator field), the mobile could send only the Origination Message used for packet data reconnect when the registration is an encryption re-sync required registration. Similarly, if the Origination Message were modified to include fields for the new BCMC frequency (BCMC frequency information included indicator, BCMC Band Class, and BCMC Frequency, or their equivalents) the mobile could send only the Origination Message used for packet data reconnect when the registration is a BCMC frequency change registration. It should also be noted that three types of registrations present special cases for which packet data reconnect is not required at all. If the registration is either a power-up registration, power-down registration, or an ordered registration, packet data reconnect will not be needed and the mobile station can just send the Registration Message.

Figure 3:
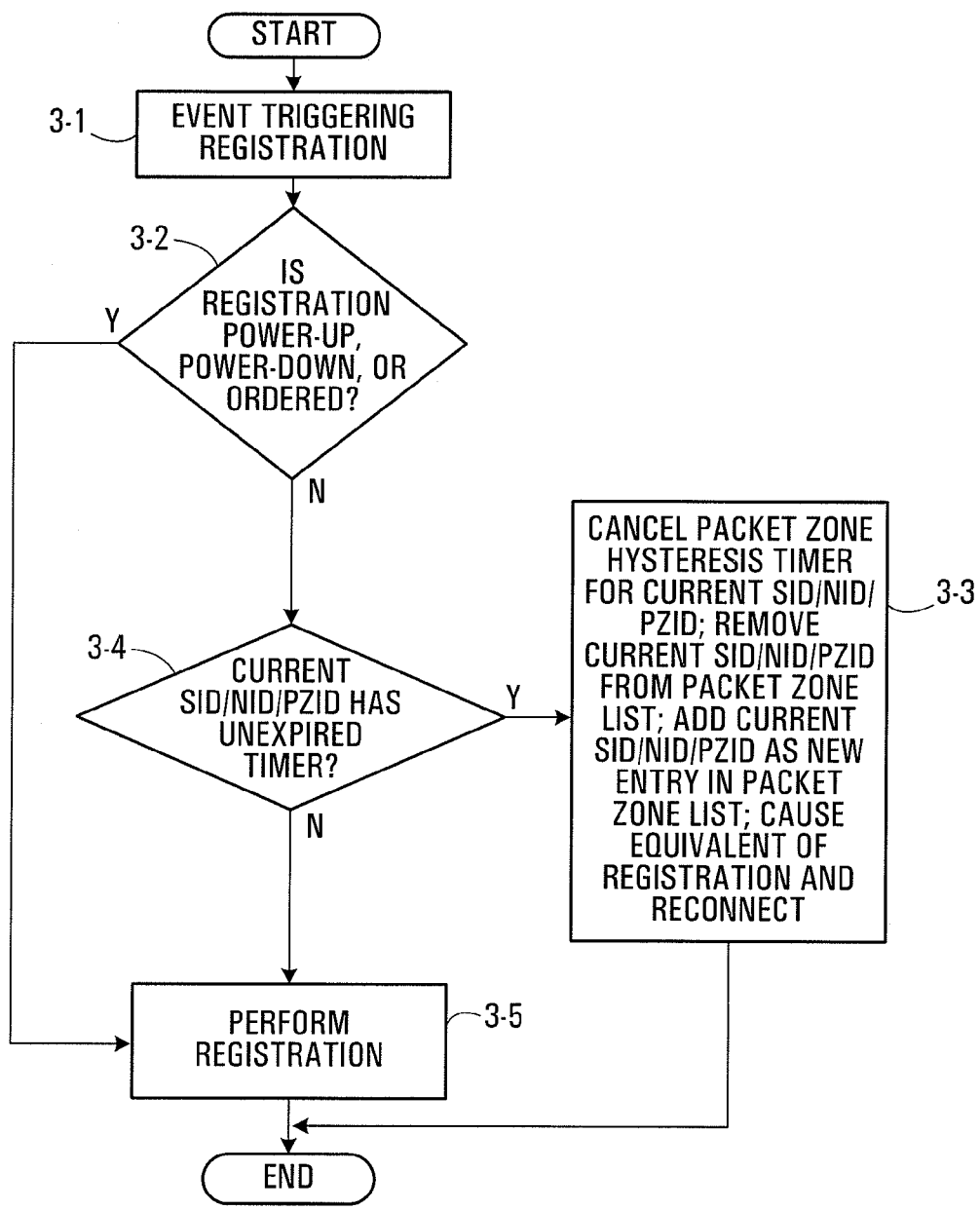
FIGS. 3 through 5 are flowcharts of methods of performing registration and reconnect in a co-ordinated manner provided by embodiments of the application.

There are many ways to achieve this result. In a first example, shown in the flowchart of FIG. 3, the new behaviour is shown from the perspective of registration with the assumption that a conventional packet zone hysteresis-based reconnect is running in the background. At step 3-1, an event triggering registration occurs. At step 3-2, a check is made to see if the registration is a power-up registration, a power-down registration, or an ordered registration. If the registration was any of these types, yes path step 3-2, then at step 3-5, an access network registration is performed by sending a Registration Message. Alternatively, if the registration is not one of these types, no path step 3-2, processing continues at step 3-4. At step 3-4, a check is made to see if there is an active hysteresis timer for the current SID/NID/PZID. If there is not an active hysteresis timer for the current SID/NID/PZID, no path step 3-4, then at step 3-5 an access network registration is performed by sending a Registration Message. Alternatively, if there is an active hysteresis timer for the current SID/NID/PZID, yes path step 3-4, then at step 3-3, the mobile station causes the equivalent of an access network registration and a packet data service registration to be performed. This can take the form of an explicit registration (i.e. the mobile station sends a Registration Message) followed by a packet data reconnect; a packet data reconnect only with an implicit registration, or a registration modified to include an indication that a reconnect is also to be performed. At step 3-3, the choice of whether to send only the Origination Message used for packet data reconnect or to send both the Registration Message and the Origination Message used for packet data reconnect can be based upon the Registration type. For example if the registration type is either encryption re-sync registration or BCMC registration then both the Registration Message and the Origination Message used for packet data reconnect are sent; otherwise only the Origination Message used for packet data reconnect is sent. At step 3-3, packet zone list maintenance functions are also performed consisting of cancelling the hysteresis timer for the current SID/NID/PZID, removing the current SID/NID/PZID from the packet zone list, and adding the current SID/NID/PZID as the newest entry in the packet zone list without a timer.

Figure 4:
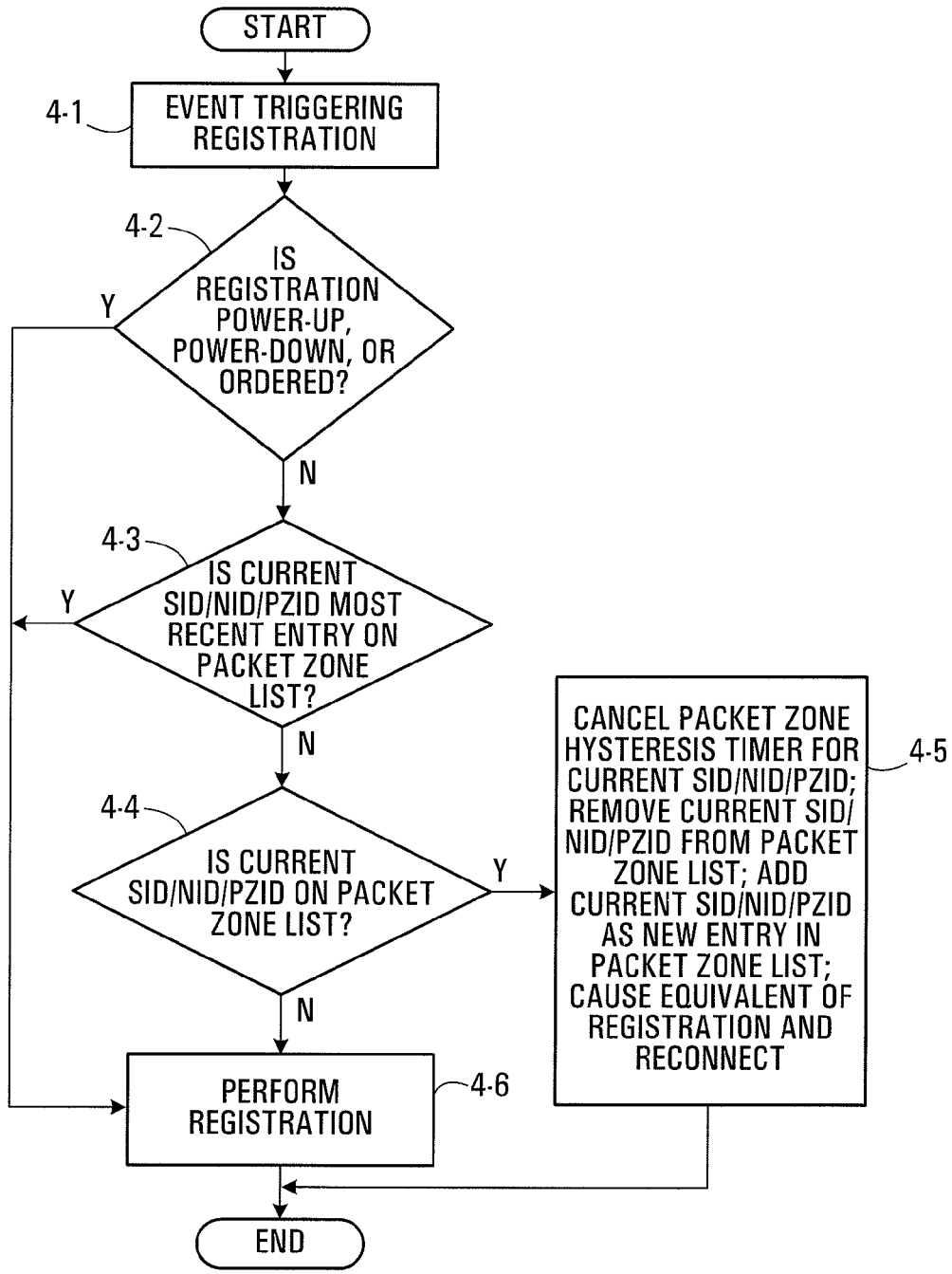

In another embodiment, the new behaviour can be shown from the perspective of the entries in the Packet Zone list when hysteresis is active. This is shown in FIG. 4. At step 4-1, an event triggering registration occurs. At step 4-2, a check is made to see if the registration is a power-up registration, a power-down registration, or an ordered registration. If the registration was any of these types, yes path step 4-2, then at step 4-6, an access network registration is performed by sending a Registration Message. Alternatively, if the registration is not one of these types, no path step 4-2, processing continues at step 4-3. At step 4-3, a check is made to see if the current SID/NID/PZID corresponds to the most recent entry on the packet zone list. If the current SID/NID/PZID corresponds to the most recent entry on the packet zone list, yes path step 4-3, this means that the mobile station already has a packet data connection for the current SID/NID/PZID and thus packet reconnect is not required, so processing continues at step 4-6 where an access network registration is performed by sending a Registration Message. If the current SID/NID/PZID does not correspond to the most recent entry on the packet zone list, no path step 4-3, processing continues at step 4-4. At step 4-4, a check is made to see if the current SID/NID/PZID is on the packet zone list. If the current SID/NID/PZID is not on the packet zone list, no path step 4-4, then at step 4-6 an access network registration is performed by sending a Registration Message. Alternatively, if the current SID/NID/PZID is on the packet zone list, yes path step 4-4, then at step 4-5, the mobile station causes the equivalent of an access network registration and a packet data service registration to be performed. This can take the form of an explicit registration (i.e. the mobile station sends a Registration Message) followed by a packet data reconnect; a packet data reconnect only with an implicit registration, or a registration modified to include an indication that a reconnect is also to be performed. At step 4-5, the choice of whether to send only the Origination Message used for packet data reconnect or to send both the Registration Message and the Origination Message used for packet data reconnect can be based upon the Registration type. For example if the registration type is either encryption re-sync registration or BCMC registration then both the Registration Message and the Origination Message used for packet data reconnect are sent; otherwise only the Origination Message used for packet data reconnect is sent. At step 4-5, packet zone list maintenance functions are also performed consisting of cancelling the hysteresis timer for the current SID/NID/PZID, removing the current SID/NID/PZID from the packet zone list, and adding the current SID/NID/PZID as the newest entry in the packet zone list without a tinier.

Figure 5:
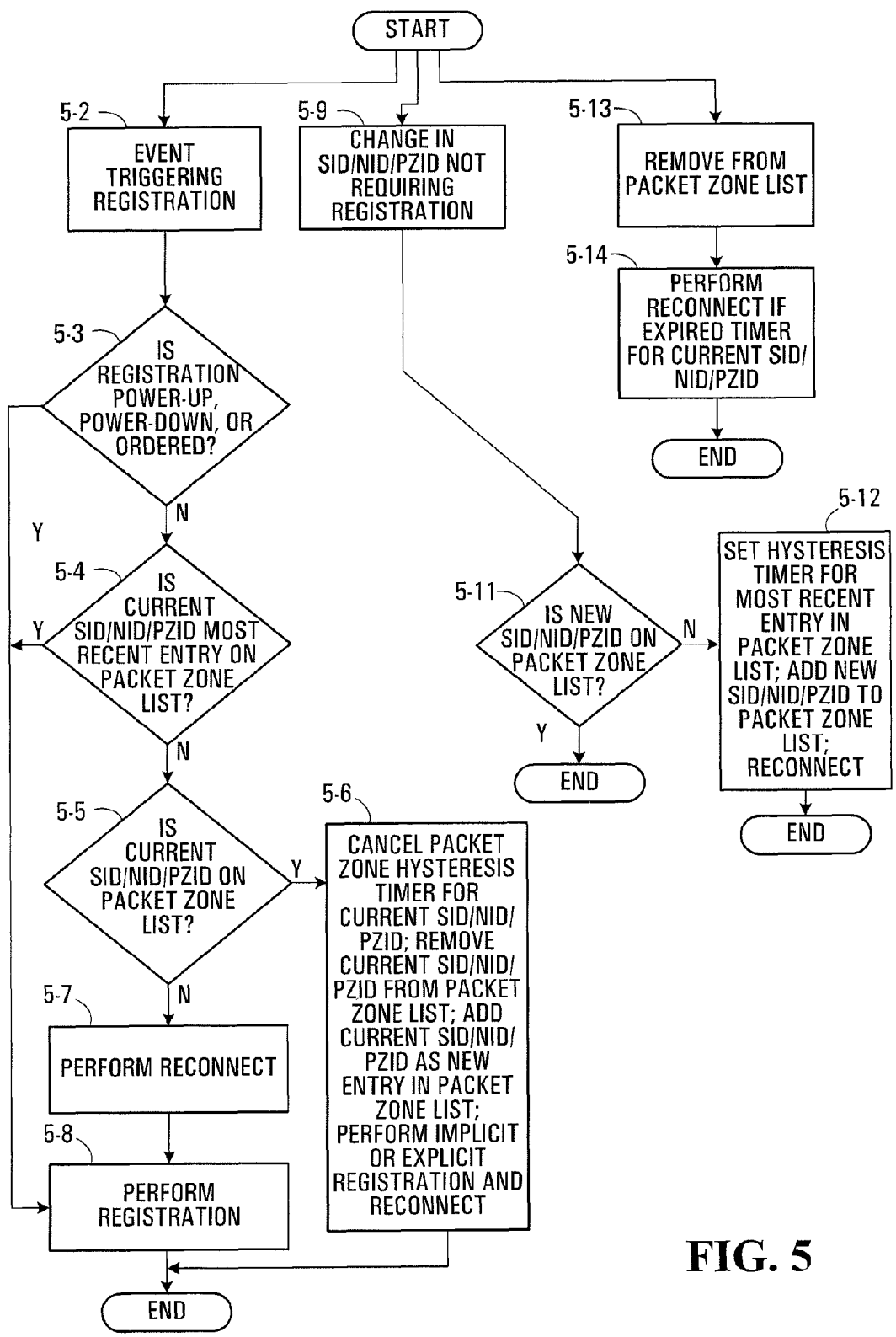

FIG. 5 is a flowchart of a new integrated reconnect/registration method. The method starts with one of three events, namely an event triggering one registration in step 5-2, a change in SID/NID/PZID not requiring registration in step 5-9, or the expiry of a hysteresis timer in step 5-13.

If it is an event triggering registration step 5-2, processing continues at step 5-3 where a check is made to see if the registration is a power-up registration, a power-down registration, or an ordered registration. If the registration was any of these types, yes path step 5-3, then at step 5-7, a registration is performed by sending a Registration Message. Alternatively, if the registration is not one of these types, no path step 5-3, processing continues at step 5-4. At step 5-4, a check is made to see if the current SID/NID/PZID corresponds to the most recent entry on the packet zone list. If the current SID/NID/PZID corresponds to the most recent entry on the packet zone list, yes path step 5-4, this means that the mobile station already has a packet data connection for the current SID/NID/PZID and thus packet reconnect is not required, so processing continues at step 5-7 where a registration is performed by sending a Registration Message. If the current SID/NID/PZID does not correspond to the most recent entry on the packet zone list, no path step 5-4, processing continues at step 5-5. At step 5-5, a check is made to see if the current SID/NID/PZID is on the packet zone list. If the current SID/NID/PZID is not on the packet zone list, no path step 5-5, then at step 5-7 a reconnect is performed (consistent with normal packet zone reconnection behaviour since there has been a change in SID/NID/PZID) and a registration is performed at step 5-8 by sending a Registration Message. Alternatively, if the current SID/NID/PZID is on the packet zone list, yes path step 5-5, then processing continues at step 5-6. At step 5-6 the hysteresis timer for the current SID/NID/PZID is cancelled, the current SID/NID/PZID is removed from the packet zone list, and the current SID/NID/PZID is added as a new entry to the packet zone list. It should be noted that before adding a new entry to the packet zone list the mobile station sets the packet zone hysteresis timer for the most recently added entry in the list as described in C.S0017-012-A v1.0 section 2.2.5. Continuing step 5-6, the mobile station causes the equivalent of an access network registration and a packet data service registration to be performed. This can take the form of an explicit registration (i.e. the mobile station sends a Registration Message) followed by a packet data reconnect; a packet data reconnect only with an implicit registration, or a registration modified to include an indication that a reconnect is also to be performed. At step 5-6, the choice of whether to send only the Origination Message used for packet data reconnect or to send both the Registration Message and the Origination Message used for packet data reconnect can be based upon the Registration type. For example if the registration type is either encryption re-sync registration or BCMC registration then both the Registration Message and the Origination Message used for packet data reconnect are sent; otherwise only the Origination Message used for packet data reconnect is sent.

In another embodiment, steps 5-7 and 5-8 can be combined in any manner that results in the equivalent of both a registration and a reconnect being performed. As outlined previously, this might consist of a reconnect with implicit registration.

On the other hand, if the initial event was a change in SID/NID/PZID not requiring registration, step 5-9, then packet zone list processing continues at step 5-11. At step 5-11, if the new SID/NID/PZID is on the packet zone list, yes path step 5-11, then nothing is done as either the mobile station is already connected to the current SID/NID/PZID (i.e. the current SID/NID/PZID is the most recent entry on the list) or the hysteresis timer is being counted down for that SID/NID/PZID and a reconnect will not occur until that timer expires. On the other hand, if the new SID/NID/PZID is not on the packet zone list, no path step 5-11, then at step 5-12, the packet zone hysteresis timer for the most recently added entry in the packet zone list is activated as described in C.S0017-012-A v1.0 section 2.2.5, the new SID/NID/PZID is added to the packet zone list, and reconnect is performed at step 5-12.

Figures 6, 7:
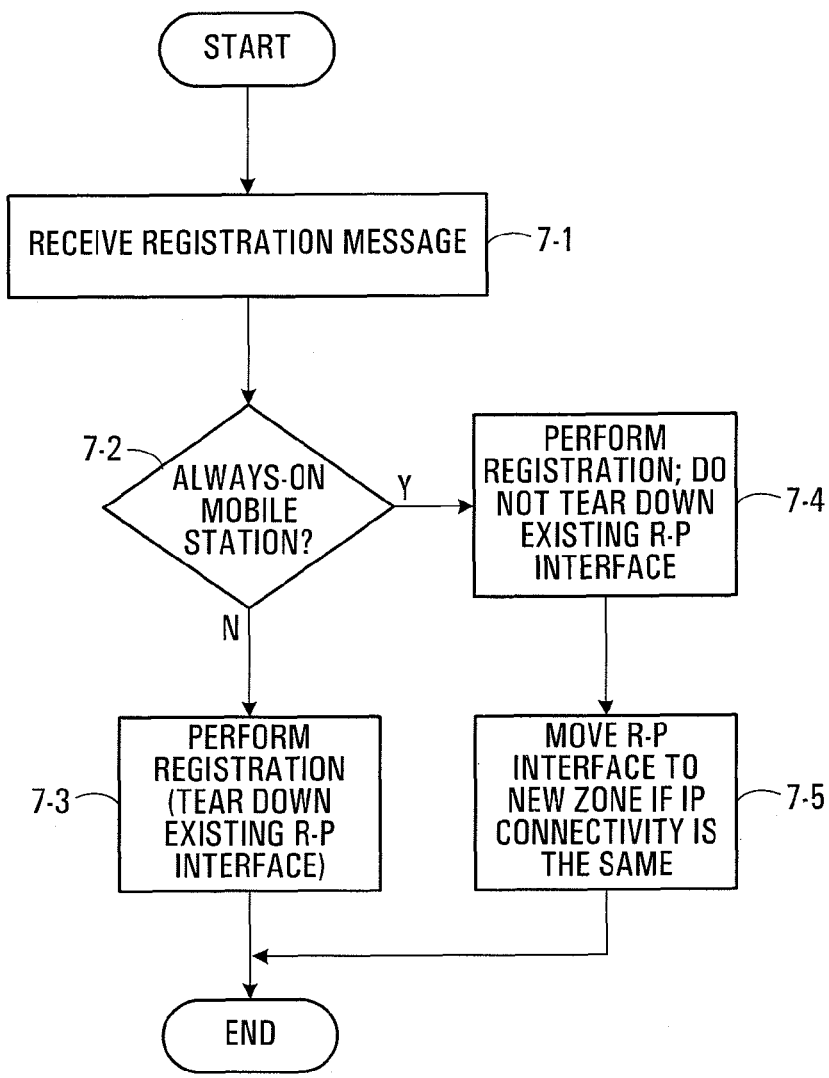
FIG. 6 is an example of a table of a packet zone list.
FIG. 7 is a flowchart of a method implemented by a network for performing co-ordinated reconnect and registration.

Finally, if the initial event was the expiry of a hysteresis timer, then the SID/NID/PZID is removed from the packet zone list at step 5-13. A reconnect is performed at step 5-14 if the timer of the current SID/NID/PZID expired. An example of a packet zone list used when hysteresis is active is shown in FIG. 6 where various SID/NID/PZID entries are shown with respective hysteresis timers $T_1, \ldots T_N$. The entries in the list are ordered from the newest on the top to the oldest on the bottom. The newest entry in the packet zone list (the topmost entry) does not have an active hysteresis timer. Before a new entry is added to the packet zone list, a hysteresis timer is activated for the newest entry currently in the list and then the new entry is added without an active hysteresis timer. It is to be clearly understood that the list shown is a very specific example. The point of hysteresis is to not immediately reconnect after changing packet zones to a zone that was previously visited within some time interval. There are many logically equivalent ways of achieving this function without necessarily implementing a list, or implementing timers.

For all of the above methods, as discussed previously, wherever the equivalent of both a registration and a reconnect are to be performed, any of the four previously introduced behaviours can be executed. These include performing a registration and then a reconnect; performing a reconnect and also an implicit registration; performing a registration using a new version of the registration message that includes one or more parameters that indicate reconnect is to also be performed; performing a reconnect that includes one or more parameters for use in registration. For some of these options, a change will also need to be implemented on the network side. In particular, in the event a new registration message is employed that indicates one or more parameters which indicates reconnect is also to be performed, the base station controller will need to be modified to understand this message and act accordingly. Similarly, for an embodiment featuring the use of a reconnect message that includes one or more parameters for use in registration, the base station controller will also need to be modified to understand the new parameters and to act accordingly.

Referring now to FIG. 7, shown is another embodiment that achieves a similar effect, but does not necessarily require changes to be made to the mobile station. In this embodiment, a change is made in the behaviour of the network side in processing registration messages. At step 7-1, the network (for example a BSC or BTS) receives a registration message. The network then checks to see if the message was received from an always-on mobile station at step 7-2. For example, an attribute may be retrieved from the AAA and maintained in the radio access network, for example in the BSC/PCF, for each mobile station to indicate whether or not it is an always-on mobile station. If it is not an always-on mobile station, no path step 7-2, then step 7-3 is performed which consists of performing a normal registration and this may involve tearing down the existing R-P interface. On the other hand, if the mobile station is an always-on mobile station, yes path step 7-2, then step 7-4 is executed. This consists of performing registration, but in so doing not tearing down the existing R-P interface. In a variant of this, step 7-5 can be performed. This consists of performing registration and moving the R-P interface to the new zone if the IP connectivity is the same. The functionality of FIG. 7 is preferably implemented in software in the base station controller. However, other implementations such as hardware, software, firmware are also contemplated. Also, this functionality could be implemented in a component other than a base station controller.

The detailed examples presented above assume that packet data service reconnect occurs across changes in SID/NID/PZID. More generally, reconnect is considered to occur across changes in packet data service reconnect zone. The reconnect zone does not have to be an actual parameter. In the particular examples given, any time any one of SID/NID/PZID changes, the reconnect zone changes. Other reconnect triggers are contemplated.

Figure 8:
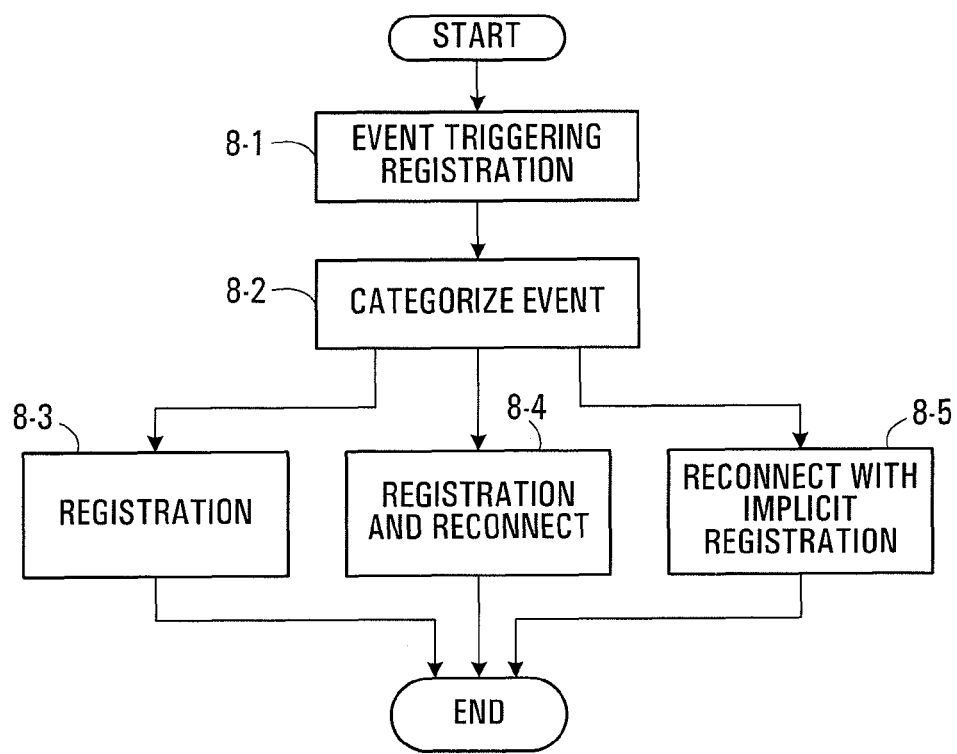
FIG. 8 is a flowchart of another method of performing registration and reconnect in a co-ordinated manner provided by an embodiment of the application.

Referring now to FIG. 8, in another embodiment, a method implemented in the mobile station involves first the occurrence of an event triggering registration at step 8-1. The event is categorized at step 8-2. Three different categorizations are shown, these including a first category for which only registration is performed at step 8-3; a second category for which registration and reconnect are performed at step 8-4, and a third category for which reconnect with implicit registration is performed. For the third category, in some embodiments the reconnect is performed with additional parameters to support particular registration types.

In a specific implementation, if the mobile station determines that a registration is required to a base station for which a packet zone hysteresis timer is active, the mobile station cancels the packet zone hysteresis timer, removes the entry from the packet zone list, adds the entry as a new entry in the packet zone list, and initiates a packet zone based reconnection by sending an Origination Message (preferably with DRS=0) if the required registration is of any of a set of defined types. In one embodiment the types are: timer-based, zone-based, parameter-change, distance-based, or user zone-based. Furthermore, in some embodiments, if the mobile station determines that a registration is required to a base station for which a packet zone hysteresis timer is active, the mobile station performs the registration, cancels the packet zone hysteresis timer, removes the entry from the packet zone list, adds the entry as a new entry in the packet zone list, and initiates a packet zone based reconnection by sending an Origination Message (preferably with DRS=0) if the required registration is of any of a set of defined types. In one embodiment, the types are: encryption re-sync required, or BCMC Registration.

In the above, it may not be necessary to explicitly cancel the hysteresis timer given that the entry has been removed from the packet zone list. This is an implementation decision.

Numerous modifications and variations of the present application are possible in light of the above teachings. It is therefore to be understood that within the scope of the appended claims, the application may be practiced otherwise than as specifically described herein.

We claim:

1. A method in a mobile station, the method comprising:
    entering a state associated with one of timer-based registration, distance-based registration, zone-based registration, parameter change registration, and user zone registration, wherein the state is associated with sending a registration message;
    determining if a packet zone list contains an entry with an active packet zone hysteresis timer for a current packet data service zone; and
    if the packet zone list contains the entry with the active packet zone hysteresis timer for the current packet data service zone,
        cancelling the active packet zone hysteresis timer prior to its expiration;
        removing the entry from the packet zone list corresponding to the current packet data service zone;
        adding a new entry to the packet zone list corresponding current packet data service zone; and
        performing an implicit access network registration by sending an origination message instead of the registration message.

2. The method of claim 1, wherein sending the origination message causes a packet data service reconnect.

3. The method of claim 1, further comprising:
    detecting an event associated with triggering one of timer-based registration, distance-based registration, zone-based registration, parameter change registration, and user zone registration; and entering the state associated with sending the registration message based on detecting the event.

4. A mobile station comprising:
a wireless access radio configured to communicate with a wireless network; and
a coordinated registration and reconnect functional element configured to
enter a state associated with one of timer-based registration, distance-based registration, zone-based registration, parameter change registration, and user zone registration, wherein the state is associated with sending a registration message;
determine if a packet zone list contains an entry with an active packet zone hysteresis timer for a current packet data service zone; and
if the packet zone list contains the entry with the active packet zone hysteresis timer for the current packet data service zone,
cancel the active packet zone hysteresis timer prior to its expiration;
remove the entry from the packet zone list corresponding to the current packet data service zone;
add a new entry to the packet zone list corresponding current packet data service zone; and
perform an implicit access network registration by sending an origination message instead of the registration message.

5. A non-transitory computer readable medium having instructions stored thereon for execution by a processor of a mobile station and cause the mobile station to:
enter a state associated with one of timer-based registration, distance-based registration, zone-based registration, parameter change registration, and user zone registration, wherein the state is associated with sending a registration message;
determine if a packet zone list contains an entry with an active packet zone hysteresis timer for a current packet data service zone; and
if the packet zone list contains the entry with the active packet zone hysteresis timer for the current packet data service zone,
cancelling the active packet zone hysteresis timer prior to its expiration;
removing the entry from the packet zone list corresponding to the current packet data service zone;
adding a new entry to the packet zone list corresponding current packet data service zone; and
perform an implicit access network registration by sending an origination message instead of the registration message.

* * * * *